United States Patent [19]

Winston

[11] 4,123,003
[45] Oct. 31, 1978

[54] SOLAR ENERGY COLLECTION PANELS AND ENERGY RECOVERY SYSTEMS

[76] Inventor: Theodore Winston, 643 Stanford Rd., Burbank, Calif. 91504

[21] Appl. No.: 720,126

[22] Filed: Sep. 3, 1976

[51] Int. Cl.² .......................... F24J 3/02; F25B 27/00
[52] U.S. Cl. .................................... 237/1 A; 126/270; 126/271; 237/2 B; 237/11; 62/2
[58] Field of Search .................. 52/316, 557; 126/270, 126/271; 62/2, 402, 403; 237/1 A, 2 B, 11

[56] References Cited

U.S. PATENT DOCUMENTS

| | | | |
|---|---|---|---|
| 4,003,365 | 1/1977 | Wiegand et al. | 237/1 A |
| 4,017,285 | 4/1977 | Edwards | 62/2 |
| 4,018,581 | 4/1977 | Ruff et al. | 62/2 |
| 4,030,312 | 6/1977 | Wallin et al. | 62/2 |

*Primary Examiner*—Henry C. Yuen
*Attorney, Agent, or Firm*—Blakely, Sokoloff, Taylor & Zafman

[57] ABSTRACT

Solar energy collection panels and energy recovery systems for recovering solar energy to reduce the power consumption in water heaters, air-conditioning systems and the like. The solar panels comprise decorative roofing panels having a second formed panel thereunder so as to define an air flow passage therebetween. The panels absorb solar energy, thereby heating the air within, which is circulated through a recovery system for utilization of the heat. Compression of the air heated by the solar panel may be used to further increase the temperature thereof for more efficient operation of the recovered energy utilization system. Details of a recovered energy utilization means are disclosed.

20 Claims, 9 Drawing Figures

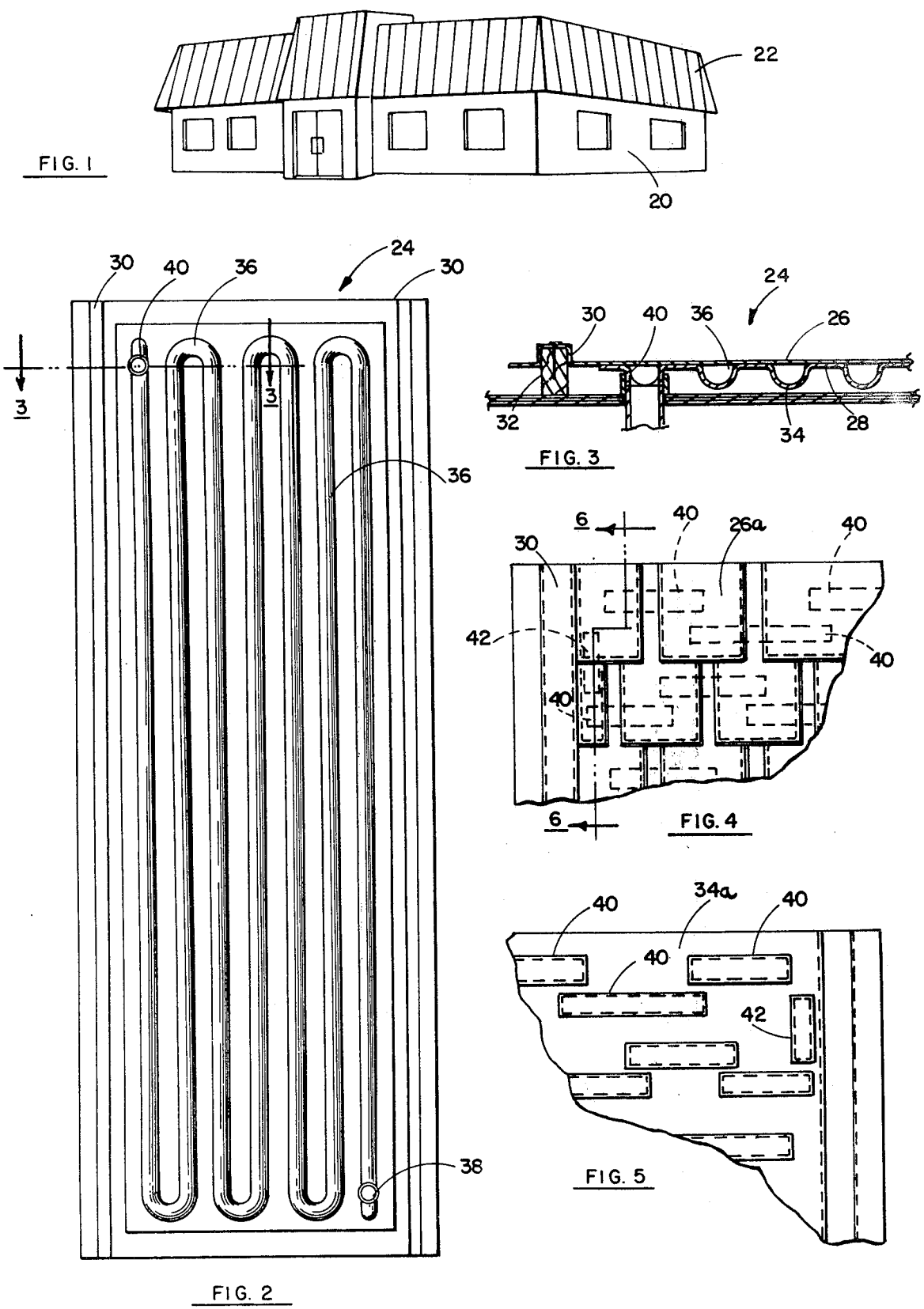

SOLAR ENERGY COLLECTION PANELS AND ENERGY RECOVERY SYSTEMS

BACKGROUND OF THE INVENTION

1. Field of the Invention

The present invention relates to the field of solar energy recovery systems.

2. Prior Art

Considerable engineering effort has been directed for many years toward the practical and efficient recovery of solar energy. Panels and systems for the recovery of solar energy in the form of both a heat source and in the form of electrical power are known, though in general such systems have not found general application probably because of their cost and the relatively low cost of electrical power and gaseous and liquid hydrocarbon fuels until very recent times. The cost of solar energy recovery systems has probably been one of the determining factors limiting the general application thereof, and is expected to continue to be an important factor as building costs are generally considered to be very high and few persons will tolerate an increase therein unless absolutely necessary. Thus to achieve general acceptance and application, the cost of the solar energy recovery system should be kept as low as possible. As shall subsequently be seen the present invention utilizes recovery panels not only serving as solar energy collectors but futher serving as decorative roofing panels providing a waterproof covering for the corresponding area of a building roof, so as to provide the dual function of energy collection and roofing in a simple and decorative manner. Further, the roofing panels are generally very light, even when simulating heavier materials such as tile, so that oftentimes the desired aesthetic character of the building may readily be achieved while effecting structural savings in the building itself because of the grossly reduced roof loading.

Since the present invention is particularly directed to the recovery of solar energy at least initially in the form of heat, only the prior art panels adapted for a similar purpose shall be described herein. The most common such solar panel presently in use for space heating, space cooling and domestic hot water heating is the liquid cooled doubled glazed flat plate collector. Such collectors generally operate on the greenhouse principle, that is, they receive light generally in the visible spectrum, convert the light to longer wavelength energy and then resist the reradiation of the converted energy, thereby allowing the accumulation and recovery of the energy in the form of heat. Thus a transparent panel such as a glass panel is desired for the outer facing panel, characterized by a high transmission of visible energy and the relatively low transmission of longer wavelength energy. While structurally, and from a cost standpoint, some plastics would be desirable for such use, most plastics do not have the desired optical characteristics, and accordingly represent poor choices for the stated purpose. However at least the structure of such panels is relatively simple in concept, and can be fabricated by almost any handyman to have an acceptable performance over a wide range of temperatures.

A preferred construction for such panels, from the standpoint of efficiency, may include copper waterways, aluminum fins, tempered glass or Tedlar glazing, aluminum or galvanized steel housings with appropriate insulation, and selected coatings, thereby resulting in both relatively high cost and substantial weight for the energy collection panels. In addition, the appearance of such flat plate collectors is anything but decorative. The characteristic smooth, shiny glazed surfaces of the panels do not create any visual interest, and are not complementary to most architectural styles. Therefore in most installations to date the panels are placed on flat roofs hidden from view from street level by shallow peripheral walls, perhaps set off aesthetically with mansards and the like.

Another deficiency of flat plate collectors is their lack of durability. Glass glazing typically weathers well but is vulnerable to vandalism, hail damage and the like. Tedlar is probably more resistant to hail and vandalism than glass but is very vulnerable to wind damage if not kept taut at all times. Further, while a rock or branch may not puncture a Tedlar film, it may cause local stretching and deforming so that subsequent winds can flap the loose film in this area causing premature fatigue failures.

Lucite and plexiglass sheets with suitable ultraviolet inhibitors are also used as glazing materials. These materials are resistant to mechanical and wind damage, though they have the disadvantage of being relatively transparent to long wavelength radiation. While this transparency can be at least partially offset by providing selective coatings on the copper waterways and their fins, such selective coatings, as previously mentioned, are themselves relatively expensive. Further, any form of plastic covering is generally subject to scratching, thereby increasing maintenance costs by requiring more care when cleaning their surfaces.

BRIEF SUMMARY OF THE INVENTION

Solar energy collection panels and energy recovery systems for recovering solar energy to reduce the power consumption in hot water, air-conditioning systems and the like. The solar panels comprise decorative roofing panels having a second formed panel thereunder so as to define an air flow passage therebetween. The panels absorb solar energy, thereby heating the air within, which is circulated through a recovery system for utilization of the heat. Compression of the air heated by the solar panel may be used to further increase the temperature thereof for more efficient operation of the recovered energy utilization system. Reexpansion of the air after passing through a heat exchanger recovers much of the energy of compression not removed as heat by the heat exchanger.

A specific recovered energy utilization means for providing heating, air-conditining and hot water for such purposes as domestic use and swimming pool heating is disclosed. The system utilizes a heat storage system comprising a hot water storage tank, with heating and cooling systems being driven by the highest temperature water available, whether from the storage tank or directly from the heat exchanger. Use of a heat operated cooling system is contemplated.

BRIEF DESCRIPTION OF THE DRAWINGS

FIG. 1 is a perspective view of a building incorporating the heat recovery system of the present invention.

FIG. 2 is a bottom view of one of the energy recovery panels of the present invention.

FIG. 3 is a cross section taken along line 3—3 of FIG. 2.

FIG. 4 is a top view of a portion of one panel of the present invention.

FIG. 5 is a view of a panel illustrating the intercoupling of the circuitous flow paths therein.

DETAILED DESCRIPTION OF THE INVENTION

Figure 6:
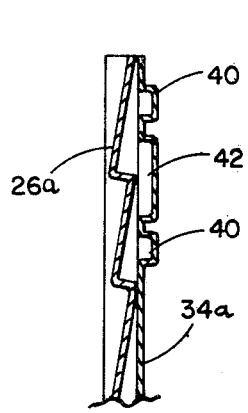
FIG. 6 is a cross section taken along 6—6 of FIG. 4.

First referring to FIG. 1, a perspective view of a building incorporating the present invention solar energy recovery panels may be seen. The particular installation shown comprises a one-story commerical building 20 having a mansard-type decorative roof 22. For the particular embodiment shown, the decorative pattern on the roof 22 is a relatively simple decorative pattern, though as shall be subsequently be seen in greater detail herein, substantially any decorative roof design may be utilized. The present invention of course comprises panels which may be utilized to cover a roof area such as the mansard of the building shown in FIG. 1, serving the dual function of decoration and heat recovery (of course further serving the normal roofing function of sealing the structure against moisture penetration). It is to be understood that the mansard-type covering is described by way of example only, as the present invention is readily applicable to any other roof configuration, such as by way of example simple slope roofs and high pitched roofs.

Details of the individual panels making up the mansard covering 22 may be seen in FIGS. 2 and 3. FIG. 2 is a view looking at the bottom of a typical panel, with FIG. 3 presenting a cross section of a panel taken along line 3—3 of FIG. 2 and generally illustrating the installation thereof. Each panel of this embodiment, generally indicated by the numeral 24, is comprised of a first upper panel 26 and a second lower panel 28 fastened thereto. Panel 26 is a substantially flat panel having ridges 30 formed at the edges thereof for fastening to a block 32 on the mansard structure for installation thereof. Adjacent panels (not shown in FIG. 3) may overlap at the mounting blocks 32 resulting in a sealed structure having decorative vertical ridges as sometimes used in the prior art for decoration purposes. The lower panel 28 is specifically formed or contoured to provide a plurality of depressions 34 innerconnected and cooperating with the upper panel 26 to define an air flow path 36. In addition to the circuitous air flow path 36, the lower panel 28 is provided with inlet and outlet passageways 38 and 40, respectively, for delivering air adjacent one end of the air flow path and removing air from the opposite end of the air flow path.

The panels 24 and more particularly the upper panel member 26 is heated by the direct impingement of sunlight, and accordingly should be provided with a high emissivity, at least 0.7 being desired and 0.85 or higher being even more desirable. In that regard the upper panel 26 could be a transparent panel, though one aspect of the present invention is the use of the upper panel 26 as a decorative panel having the color and physical appearance chosen in accordance with the decor of the building desired. Thus in the preferred embodiment the panel 26 is an opaque panel having a relatively high emissivity and having a decorative pattern (in the embodiment of FIGS. 1 through 3 a simple decorative pattern) impressed thereon. In order to achieve very good heat transfer through the thickness of the panel 26 it is preferable that the panel be thin, within the structural limits and requirements for the panel, and most preferably that the panel be a metal panel. It should be noted however that plastic panels, at least in some installations, may represent a desirable compromise because of the ease of manufacturing panels of the desired decorative pattern and their durability in use.

It will be noted that the air flow path of panel 24 is a rather circuitous path rather than a simple direct flow-through configuration. Of course a straight flow-through configuration could be used, though it is important to select the flow path dimensions and air flow rate to minimize the pressure drop through the panel, and to efficiently achieve the desired heat transfer and temperature rise of the air passing through the panel while maintaining overall flow rates.

Now referring to FIGS. 4, 5 and 6 an alternate form of panel is shown. This embodiment illustrates one of the strong advantages of the panels of the present invention, that is, their ability to duplicate prior art roofing materials in appearance even when such appearance requires a substantial three dimensional pattern thereon. In particular these FIGURES illustrate a roof panel duplicating or having the physical appearance of a standard shake shingle roof. Thus the upper panel member 26a is formed so as to simulate a plurality of installed shake shingles and to abut a similar panel to continue the shake shingle pattern. The lower panel 34a is formed in a cooperative contour so as to define flow passages between adjacent simulated shingle elements. Thus as may be seen from FIGS. 4, 5 and 6, depressions 40 in cooperation with the contour of the upper panel 26a define an air flow path between adjacent simulated shingles, while depressions 42 define air flow paths between one simulated shingle and the next simulated shingle thereabove. Accordingly, the upper panel 26a may be formed in substantially any desired pattern provided the lower panel is contoured in a cooperative manner to define the desired flow path portions. In fact, patterns such as the simulated shingle pattern have the advantage of tending to disturb the laminar flow thereby enhancing the heat transfer from the upper panel 26 to the air flow stream.

Figure 7:
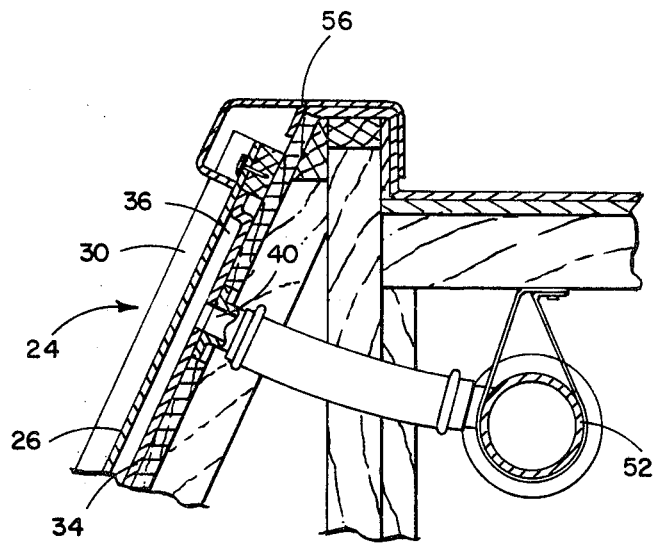
FIGS. 7 and 8 are cross sections of portions of the building of FIG. 1 illustrating a manifolding of the energy recovery panels of the present invention in a typical installation.
Figure 8:
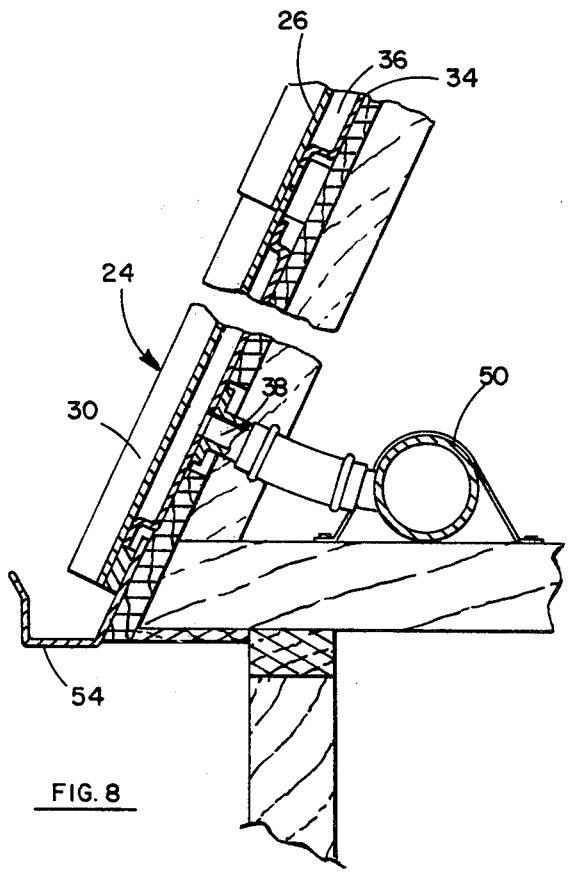

Now referring to FIGS. 7 and 8, additional details of the various panels as part of a system may be seen. In particular the inlet and outlet on the panels are coupled to an inlet manifold 50 for distributing air to the various panels and an outlet manifold 52 for receiving the heated air from the panels. The inlet and outlet manifolds 50 and 52 and the various lines communicating therewith, of course, are preferably insulated so as to avoid loss of heat therefrom. For a mansard type installation such as that shown in FIG. 1, it may also be desirable to provide valves for the various panel section so that panel usage may be changed as the sun position changes, e.g., eastwardly facing panels used in the morning hours, all panels used around noon, and westwardly facing panels used in the afternoon hours. Of course other aspects of the installation such as the gutter 54, cap 56, etc., may be aesthetically complimentary but conventional in design.

Figure 9:
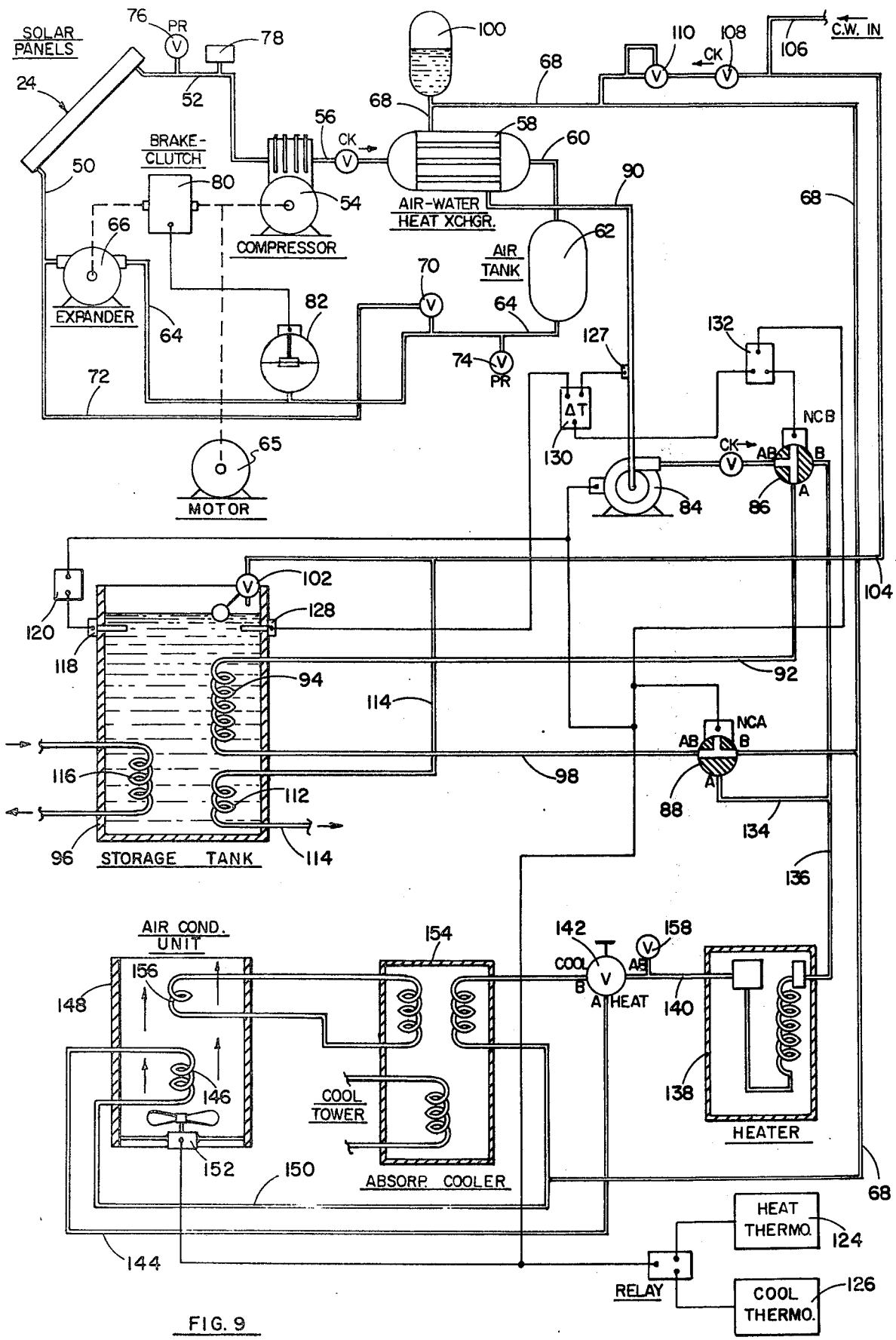
FIG. 9 is a schematic diagram of a complete exemplary solar energy recovery system in accodance with the present invention.

Now referring to FIG. 9 a schematic diagram of a system utilizing the present invention may be seen. The various panels 24 are manifolded through line 52 to a recovered energy utilization means, with the air being returned from the utilization means through line 50. Since one aspect of the present invention is the utilization of solar energy recovery panels which are far more durable, less expensive and more decorative than prior art panels, though perhaps resulting in somewhat lower efficiency energy recovery than the best of the prior art panels, the temperature of the air in line 52 received from the panels may be lower than desired for the utilization means. Accordingly in most installations it is preferable to heat the air, more specifically by passage through a compressor 54 driven by an electric motor 65 to compress the air in a substantially adiabatic process, thereby simultaneously increasing its temperature. The output of the compressor 54 on line 56 in the embodiment shown passes through a heat exchanger 58, with the cool but still elevated pressure air received from the heat exchanger 58 passing through line 60 to a temporary storage tank 62, and from there through line 64 to a turbine or other device 66 for recovering mechanical energy from the air as the air is allowed to expand back to the lower pressure. While the mechanical energy recovered in the expander 66 might be used for various purposes, typically the compressor 54 and expansion device 66 will be directly mechanically coupled so that the energy recovered upon expansion of the air may be used to minimize the power required by the electric motor 65 to drive the compressor.

As shall subsequently be seen, the heat exchanger 58 in the preferred embodiment is preferably a reverse flow air to water heat exchanger to facilitate the transfer of the recovered heat to the desired location through a low cost heat carrying medium (e.g., water). In general the heat exchanger air outlet in line 60 will have the same pressure (neglecting slight losses) as the outlet of the compressor in line 56, though the volumetric rate of flow of the outlet will be less than the rate of flow in line 56 by an amount dependent upon the heat recovered by the heat exchanger (e.g., as a result of the temperature drop in the air passing through the heat exchanger). Since the temperature of the inlet water to the heat exchanger in line 68 may vary depending upon the operating conditions, a perfect match between the compressor 54 and the expansion device 66 is not generally attainable for any specific system. Accordingly, in the preferred embodiment the expander 66 is proportioned to slightly lower capacity than ideal, such as by way of example, 10 percent low, so that the air mass flow through the expander is slightly less than the air mass flow through the compressor. In this manner there will normally be a slight pressure buildup in line 64, with a pressure relief valve 70 limiting the upper pressure by providing a by-pass flow path through line 72 to the manifold 60 supplying the air to the solar panels. Accordingly, the air flow loop of the system shown in FIG. 9 is self regulating with respect to flow between the compressor and the expander, by the proportioning of the two to provide a gradually increasing pressure therebetween, and by the simple by-pass valve limiting the pressure therebetween to the desired control value. In the preferred embodiment the pressure relief valve 70 is set at approximately 33 psi pressure (gauge) though of course the specific pressure will depend upon the extent of temperature rise and thus pressure ratio desired from the compressor 54. As an additional safety factor, a second pressure relief valve 74 vented to the atmosphere is provided, with this valve being set at a somewhat higher pressure, such as by way of example 50 psi, so as to provide a back-up pressure relief for the system.

The component elements of the air flow system which are least resistive to pressure extremes in the preferred form of the present invention are the solar panels 24, as these panels are specifically intended to be of simple construction, utilizing low cost materials such as vacuum formed or injection molded plastic, and using material thicknesses and assembly techniques not condusive to substantial differential pressures. Further, the substantial expansion, contraction and/or compression of the air in the "closed" system during variations in operating conditions and particularly during start up and shut down of the system requires careful control of the pressure at the panels, and addition or exhaust of system air as required to maintain this pressure. Accordingly in the preferred embodiment a simple pressure relief 76 is provided in the outlet line 52 from the panel, preferably set at a slight positive differential pressure, such as by way of example, 1 psi. In addition, a vacuum breaker 78 is provided (with an air filter thereon) to limit the vacuum which the panels may be subjected to, in the preferred embodiment approximately one psi vacuum. Thus the combination of the pressure relief valve 76 and the vacuum breaker 78 clamp the pressure of the collector panels to approximately atmospheric pressure, independent of the operating condition (or nonoperation) of the rest of the system.

For starting the system (e.g., the closed loop air flow system), it is preferable to limit flow downstream of the air tank 62 so that the high pressure portion of the system is brought up to approximately the operature pressure in a rapid manner. One way of accomplishing this is to decouple the compressor 54 and the expansion device 66 through a clutch/brake set 80, and to brake the expansion device so that the only flow allowed therethrough is leakage during the start-up phase. A simple pressure sensor 82 in line 64 may be used to provide a control signal to the brake/clutch set to release the brake and engage the clutch as the operating pressure is approached. (A one-way clutch will provide smooth engagement when the brake is released and the expander comes up to speed, so that only a simple brake control is needed. Also, as an alternative, depending upon the mechanical characteristics of the expansion device, appropriately placed air-flow valves might be used to temporarily block the flow until operating pressures are approached.) In the preferred embodiment the pressure control 82 is operative at approximately 29 psi, thereby bringing the system up to a satisfactory operating pressure, with subsequent operation resulting in the drift upward therefrom to the 33 psi control determined by the pressure relief valve 70.

The air flow loop is self-regulating as hereinbefore described, resulting in the delivery of high temperature air to the heat exchanger 58 which forms a part of an appropriate heat utilization means. In the embodiment shown in FIG. 9, the utilization means includes means for providing building air-conditioning, building heating and a supply of hot water for use in the building restrooms and the like. Of course this utilization means is described herein in detail for exemplary purposes only, though is illustrative of the broad range of possible application of the invention.

When the system of FIG. 9 is operating but neither heating nor air-conditioning is called for (e.g., the main control is set to heating or air-conditioning, but the respective thermostat is off), pump 84 is operating, valve 88 has port B open and port A closed. In this condition pump 84 draws water through line 90 from the heat exchanger 58 and forces the water through the valve 86, through line 92 and coils 94 in a hot water storage tank 96, with the water in the closed system recirculating through line 98, valve 88 and line 68 back to the water inlet for the heat exchanger 58. (In order to accommodate the expansion of the water in the closed system, an expansion tank 100 is provided.) With the flow path just described, heat is removed from the air passing through the heat exchanger 58 and circulated through the heating coils 94 in the storage tank 96 to heat the water therein.

The storage tank itself, generally an insulated storage tank, is maintained substantially full of water for the storage and return of heat to the system by a float valve 102 coupled through line 104 to a main (cold) water input line 106. This same input line, protected by a check valve 108, supplies a pressure operated valve 110 (regulator) responsive to the pressure in line 68 to supply make-up water to the closed system as required, indicated by the drop in the pressure in line 68. (Pressure regular 110 is used to keep the water lines under pressure to prevent cavitation at the pump inlet. This is important during cooling when the water temperature is close to boiling. Also hysteresis of the heater thermostat [set at 210° F.] and/or overshoots can cause steam to form with the heater reducing heater efficiencies.) Thus, when neither heating nor cooling is required, heat is delivered to the storage tank 96 for storage for later use. In addition, a heating coil 112 coupled through line 114 and line 104 to the main water supply 106 may be used to deliver hot water on line 114 for domestic use, etc. Further, if a facility such as a motel has other requirements for hot water, such as by way of example for heating a swimming pool, additional coils 116 may be used for such purpose. A thermostat 118, preferably set at approximately 190°, is provided to actuate a relay 120 to shut off pump 84. (If heating or air conditioning is called for however, pump 84 will remain on as will subsequently be described.)

Whenever either heating or cooling is called for by the heating thermostat 124 or the cooling thermostat 126, pump 84 is turned on (or maintained on). Temperature sensors 127 and 128 in line 90 and in the storage tank 96 provide differential temperature inputs to a differential temperature control 130 to provide a signal for operating the valve 86 (the differential temperature controller 130 is coupled to valve 86 through the contacts of a normally open relay 132, which is actuated to the closed position by the demand of either the heating or the cooling thermostats 124 and 126 for heating or cooling respectively). When the temperature in the storage tank 96 sensed by the sensor 128 is higher than the temperature of the water received from the heat exchanger in line 90 as sensed by temperature sensor 126, valve 86 is left in its normal position, that is, with B closed and A open, so that water is delivered from the pump 84 through the valve 86 and line 92 to receive heat from the storage tank 96. The thermostat signal also actuates valve 88 to change it from its normal condition with port A closed and port B opened to port A open and port B closed, whereby the water in line 98, further heated by the heat stored in storage tank 96, may flow through line 134 and line 136 to the heater 138. If, however, the water in line 90 is hotter than that in the storage tank 96, valve 86 is actuated so that port B is open and port A is closed, thereby delivering the water from the heat exchanger directly to line 136 and heater 138. Accordingly, the differential temperature control provides the hottest water available, e.g., either directly from the heat exchanger, or from the heat exchanger as further heated by the storage tank, to the heater 138.

The operation of the remaining portion of the system depends upon whether the heating thermostat 124 or the air-conditioning thermostat 126 was actuated. Preferably the heating and the cooling thermostats are common thermostats, so that heating and cooling may not be called for at the same time, and in fact in the preferred embodiment are mechanically arranged so that a manual selection between the thermostatically controlled heating or the thermostatically controlled air-conditioning must be made. As shall subsequently be seen, this selection also affects the operation of the heater 138 to provide most efficient operation for the heating and air conditioning cycles.

When the system is set to provide heating, the heater 138 is set so that the output therefrom on line 140 is maintained at at least 120° F. In winter months this may require the operation of the heater, which may be a gas fired heater by way of example, or on warmer days may be provided directly by the water in line 136. In any event, valve 142 is set with port B closed and port A open so that the water in line 140 will pass through line 144, coils 146 and the air-conditioning unit 148, being returned therefrom through line 150 to line 68 for return to the heat exchanger. The heating thermostat 124, of course, also controls the fan 152 to drive the air over the coils 146 and out into the area to be heated.

If on the other hand cooling is selected, the thermostat for the heater 138 is set to provide an output temperature considerably higher than 120° F, specifically in the preferred embodiment on the order of 210° F., as such higher temperatures provide better operation of absorption type air-conditioners. Also valve 142 is changed so that the B port is open and the A port is closed, so that the heated water is delivered to the absorption cooler 154, which in turn provides coolant to coils 156 in the air-conditioning unit 148, again using fan 152 for forcing the air through the air-conditioning system. Suitable absorption type coolers for the absorption cooler 154 are well known in the prior art, the model WF-300 25 ton water chiller manufactured by the Servel Division of Arkla Industries, Inc., providing but one example of such coolers. (As a safety device, a pressure relief valve 158 is provided at the output of the heater 138 to provide a steam exhaust in the vent of failure of the heater temperature control system.)

Thus it may be seen that in accordance with the foregoing description, the system of FIG. 9 provides the capability of heating, air-conditioning and water heating for domestic or other purposes, such as swimming pool water heating. The system provides for the relatively inexpensive collection of solar energy for storage in a water tank when neither heating nor cooling is required, and for providing heat to heating systems or heat driven air-conditioning systems such as absorption air-conditioning systems when required, dependent upon thermostatic control, utilizing the highest temperature source of heat then available. The system further includes various controls for the automatic operation thereof, with enhancement being provided, particularly on cooler days, by such means as gas heaters, compressors and the like to provide most efficient operation over a relatively wide variety of operating conditions.

Thus, while one system embodiment has been disclosed and described in detail herein with respect to FIG. 9, the selected embodiment for such description is generally suggestive of a broad range of possible application of the inventive system. Accordingly, it will be obvious to those of reasonable skill in the art that various changes in form and detail may be made therein without departing from the spirit and scope of the invention.

I claim:

1. A system for recovering solar energy comprising:
   a plurality of roofing panels, each having a decorative outer surface with an air flow path thereunder, each of said panels having inlet means adjacent one end of said flow path for delivering air thereto and outlet means adjacent the second end of said flow path for receiving air therefrom;
   a compressor for compressing air delivered thereto;
   a first manifold means coupled between said outlet means and said compressor to deliver heated air from said panels to said compressor;
   heat utilization means coupled to said compressor for removing heat from air received from said compressor;
   expansion means coupled to said utilization means for controllably reducing the pressure of air delivered thereto; and
   second manifold means coupled to said expansion means for delivering air passing through said expansion means to said inlet means on said plurality of roofing panels.

2. The system of claim 1 wherein said expansion means is a means for extracting mechanical energy from said air upon the reduction in pressure thereof.

3. The system of claim 2 wherein said expansion means is coupled to said compressor to deliver the mechanical energy extracted from said air in the expansion means to said compressor.

4. The system of claim 1 wherein said panels are opaque so as to not transmit visible light from above to said air flow paths.

5. The system of claim 1 wherein said utilization means includes an air-water exchanger to transfer heat from the air received from said compressor to water in said utilization means.

6. The system of claim 1 wherein said outer surfaces of said plurality of roofing panels have a three dimensional decorative pattern thereon.

7. The system of claim 1 wherein each of said roofing panels comprise:
   a first decorative opaque upper panel member;
   a second lower panel member coupled to said first panel member, said second panel member being contoured in cooperation with the contour of the inner surface of said first panel member to define said air flow path therebetween.

8. The system of claim 7 wherein said first panel member of said roofing panels is a metal panel member.

9. The system of claim 7 wherein said first panel member of said roofing panels is a plastic panel.

10. The system of claim 7 wherein said first panel member of said roofing panels has an emissivity of at least 0.7.

11. A system for recovering solar energy comprising:
    a plurality of roofing panels, each having a first decorative opaque upper panel member, a second lower panel member coupled to said first panel member, means cooperating with said first and second panel members to define an air flow path therebetween, inlet means adjacent a first end of said flow path for delivering air thereto, and outlet means adjacent a second end of said flow path for receiving air therefrom;
    a compressor for compressing air delivered thereto;
    a first manifold means coupled between said outlet means and said compressor to deliver heated air from said panels to said compressor;
    heat utilization means coupled to said compressor for removing heat from air received from said compressor;
    expansion means coupled to said utilization means for controllably reducing the pressure of air delivered thereto and extracting mechanical energy from the air as a result of said pressure reduction;
    means for communicating the mechanical energy from said expansion means to said compressor; and
    second manifold means coupled to said expansion means for delivering air passing through said expansion means to said inlet means on said plurality of roofing panels.

12. The system of claim 11 wherein said heat utilization means comprises a building heating system.

13. The system of claim 11 wherein said heat utilization means comprises a heat exchanger for exchanging heat between air received from said compressor and a second medium.

14. The system of claim 13 wherein said heat utilization means includes means for utilizing heat in said second medium, and further comprised of means for adding further heat to said second medium between said heat exchanger and said means for utilizing heat in said second medium.

15. The system of claim 14 wherein said means for utilizing heat in said second medium comprises an absorption cooler.

16. The system of claim 13 further comprised of storage means for storing heat received from said heat exchanger.

17. The system of claim 16 wherein said second medium is water.

18. The system of claim 16 wherein said storage means comprises a water storage means.

19. The system of claim 16 wherein said heat utilization means includes means for utilizing heat in said second medium, and further comprised of means for delivering said second medium to said means for utilizing heat in said second medium as heated by said storage means or said heat exchanger based on the relative temperatures thereof.

20. The system of claim 16 further comprised of means of heating water from said storage means.

* * * * *